US006619455B2

(12) United States Patent
Diemer et al.

(10) Patent No.: US 6,619,455 B2
(45) Date of Patent: Sep. 16, 2003

(54) CLUTCH DISK

(75) Inventors: Matthias Diemer, Niederwerrn (DE); Andreas Orlamünder, Schweinfurt (DE); Andreas Dau, Würzburg (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/915,597

(22) Filed: Jul. 26, 2001

(65) Prior Publication Data

US 2002/0017444 A1 Feb. 14, 2002

(30) Foreign Application Priority Data

Aug. 3, 2000 (DE) .......................................... 100 37 895

(51) Int. Cl.[7] .............................................. F16D 13/38
(52) U.S. Cl. .................. 192/52.3; 192/107 R; 192/201; 192/55.61
(58) Field of Search ............................... 192/201, 55.61, 192/107 R, 30 V, 105 CD, 52.3, 110 R

(56) References Cited

U.S. PATENT DOCUMENTS

| | | | | |
|---|---|---|---|---|
| 892,175 A | * | 3/1908 | Miller | 192/105 |
| 1,934,109 A | * | 11/1933 | Wemp | 192/52.3 |
| 2,135,126 A | * | 11/1938 | Harwood | 192/52.3 |
| 2,879,873 A | * | 3/1959 | Spase | 192/104 |
| 3,218,828 A | * | 11/1965 | Thelander | 64/27 |
| 3,246,727 A | * | 4/1966 | Moore | 192/105 |
| 3,296,887 A | * | 1/1967 | Larsen | 74/574 |
| 3,362,512 A | * | 1/1968 | Ericson | 192/68 |
| 3,375,911 A | * | 4/1968 | Smirl | 192/107 |
| 3,810,533 A | * | 5/1974 | Densow | 192/103 B |
| 4,113,075 A | * | 9/1978 | Walker | 192/103 B |
| 4,294,342 A | * | 10/1981 | St. John | 192/105 CD |
| 4,296,852 A | * | 10/1981 | Luerken | 192/104 B |
| 4,563,165 A | * | 1/1986 | Takeuchi | 192/201 |
| 4,569,668 A | * | 2/1986 | Fukushima | 192/214.1 |
| 4,635,777 A | * | 1/1987 | Nickel et al. | 192/105 CD |
| 4,640,402 A | * | 2/1987 | Hartig et al. | 192/110 R |
| 5,167,312 A | * | 12/1992 | Thirion de Briel et al. | 192/107 R |
| 5,201,394 A | * | 4/1993 | Suzuki | 192/201 |
| RE34,648 E | * | 6/1994 | Blond | 192/201 |
| 5,666,862 A | * | 9/1997 | Eckel et al. | 464/180 |

* cited by examiner

*Primary Examiner*—Charles A Marmor
*Assistant Examiner*—Eric M. Williams
(74) *Attorney, Agent, or Firm*—Cohen, Pontani, Lieberman & Pavane

(57) ABSTRACT

A clutch disk includes a hub area and a plurality of friction lining elements arranged in sequence in the circumferential direction relative to a clutch disk rotational axis, each providing at least part of an associated friction surface area. The friction lining elements are intended to make frictional contact with the associated opposing friction surface of a flywheel, a pressure plate, or the like. At least one of the friction lining elements is supported on the hub area in such a way that it can move in the radial direction.

6 Claims, 1 Drawing Sheet

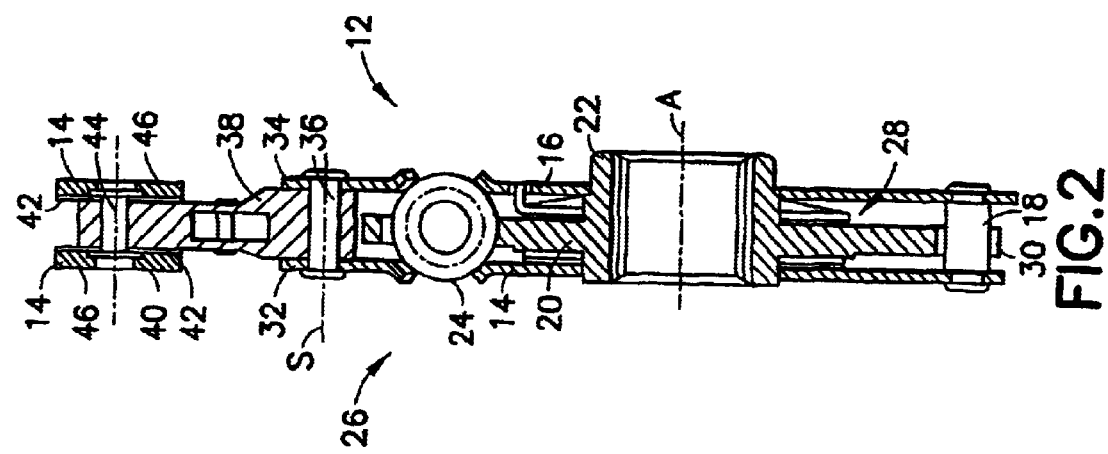
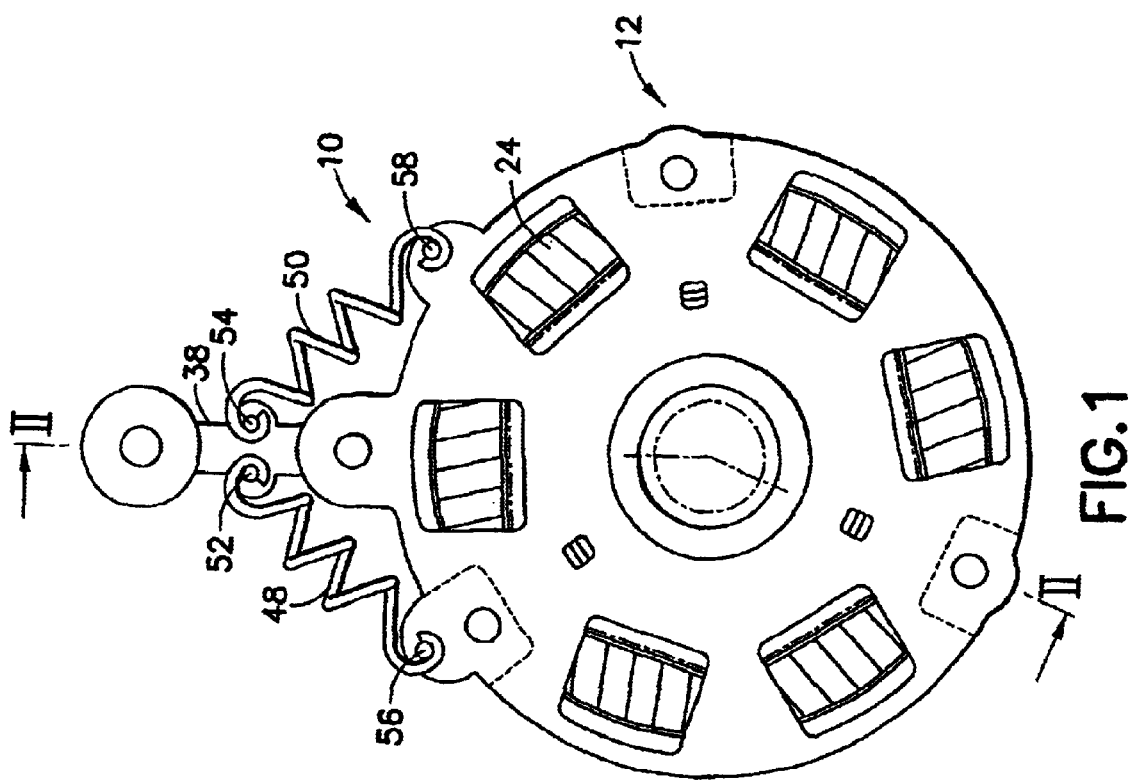

CLUTCH DISK

BACKGROUND OF THE INVENTION

1. Field of the Invention

The present invention pertains to a clutch disk, including a hub area and a plurality of friction lining elements which are supported on the hub area and arranged in sequence in the circumferential direction relative to a clutch disk rotational axis, and each of which provides at least part of an associated friction surface area. The friction lining elements are intended to make frictional contact with the associated opposing friction surface of a flywheel, a pressure plate, or the like.

2. Description of the Related Art

In conventional clutch disks, the friction lining elements are usually connected either rigidly or by way of axially elastic lining springs to the hub area of the clutch disk. This rigid connection has the result that, when, for example, there is a change in the local frictional relationships such as an increase in the coefficient of friction of the surfaces rubbing against each other, a spontaneous change in the torque transmitted or to be transmitted via the clutch can occur even though ultimately no change has been made in the force of the pressure being applied, which is determined by the release mechanism.

SUMMARY OF THE INVENTION

The object of the present invention is to design a clutch disk so that defined torque transmission conditions are still present, even when there are changes in, for example, the local frictional relationships in a friction clutch equipped with this type of clutch disk.

This object is achieved by a clutch disk, comprising a hub area and a plurality of friction lining elements, which are arranged in sequence in the circumferential direction relative to a clutch disk rotational axis and each of which makes available at least part of a friction surface area, where the friction lining elements are intended to make frictional contact with the associated opposing friction surface of a flywheel, a pressure plate, or the like.

At least one of the friction lining elements is supported on the hub area in such a way that it can move in the radial direction.

The present invention takes advantage of the relationship between the torque $M_K$ transmitted via the clutch disk or the clutch and various other parameters such as the coefficient of friction $\mu$, the average friction radius r, the normal force $F_N$ between the surfaces rubbing against each other, and the number z of friction surface pairs rubbing against each other. This relationship is expressed by the following formula:

$$M_K = \mu \times z \times r \times F_N.$$

The present invention takes advantage of the fact that, for example, when there is a local change in the coefficient friction $\mu$, such as an increase in $\mu$, the ability to shift the friction lining elements, or at least one of them, in the radial direction to an appropriate extent, thus producing a corresponding reduction in the average friction radius r, can compensate for the increase in $\mu$. The same is also true for an increase in the normal force $F_N$, which can be induced, for example, by a local bulge in one of the opposing friction surfaces. Here, too, an increase in the normal force can be compensated by an appropriate reduction in the average friction radius r.

As already explained, it can be provided in the clutch disk according to the invention that the minimum of one friction lining element is designed so that it can shift in the radial direction in response to a change in the sliding frictional interaction prevailing between its own friction surface area and the opposing friction surface which is or can be associated with it.

In order to prevent simultaneously the occurrence of frictional vibrations, which can also be induced by local changes in the frictional relationships, at least one friction lining element can be supported on the hub area in such a way that it can move at least approximately in the circumferential direction relative to the rotational axis.

So that both the radial distance and the circumferential position can be changed in this way, the minimum of one friction lining element can be provided with the ability to pivot relative to the hub area around a pivot axis, which is essentially parallel to the rotational axis and a certain radial distance away from it. To ensure that the minimum of one friction lining element with a variable radial position is also held in a defined position under steady-state conditions, a restoring device can be provided to preload the minimum of one friction lining element relative to the hub area into a home pivot position.

When in particular account is to be taken of local changes in the frictional relationships which are not distributed over the entire friction area, then it is advantageous for the minimum of one friction lining element or a group of friction lining elements to be able to shift in the radial direction essentially independently of other friction lining elements or groups of friction lining elements.

The present invention also pertains to a friction clutch with a clutch disk according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows a partial axial view of a clutch disk according to the invention; and FIG. 2 shows a cross-sectional view of the clutch disk shown in FIG. 1 along line II—II in FIG. 1.

DETAILED DESCRIPTION OF THE PRESENTLY PREFERRED EMBODIMENTS

The clutch disk 10, as shown in FIGS. 1 and 2, comprises a hub area 12 on which, as will be described in greater detail below, a plurality of friction lining elements 14 is supported in the radially outer area. The hub area 12 has cover disk elements 14, 16, which are a certain axial distance apart and are connected rigidly to each other by means of clinch bolts 18 or the like. Axially between the two cover disk elements 14, 16, there is a central disk element 20, which is rigidly connected in its radially inner area to a hub 22 or possibly made as an integral part thereof. The hub 22 is designed so that it can be connected nonrotatably but with freedom of axial movement to a shaft such as a transmission input shaft. A plurality of damper springs 24 acts between the cover disk elements 14, 16 and the central disk element 20; these springs are arranged in sequence around the circumference and are installed in individual spring windows in the cover disk elements 14, 16 and in the central disk element 20, where they are supported against associated guide edges. In this way, a torsional vibration damper 26 is provided in the clutch disk 10. In addition, a frictional damping device designated 28 overall also acts between the cover disk elements 14, 16 and the central disk element 20.

The cover disk elements 14, 16 are as a result able to move within a certain rotational angle in the circumferential direction relative to the central disk element 20 against the action of the damper springs 24 and of the frictional damping device 28 in order to damp the rotational vibrations which occur during rotational operation (i.e., rotation without slip). The bolts 18, which engage in associated recesses 30 extending in the circumferential direction in the central disk element 20, impose a limit on the extent of this angular movement.

In the radially outer area, the cover disk elements 14, 16 have radially outward-projecting tab sections 32, 34 at several points on the circumference, on which sections a pivot arm 38 is carried by a bolt-like axle part 36 so that it can pivot around a pivot axis S, which is essentially parallel to the rotational axis A of the clutch disk. It should be pointed out that, in FIG. 1, only a single pivot arm 38 is shown. It is obvious that several of these pivot arms 38 can be distributed around the circumference and supported on the cover disk elements 14, 16, each capable of pivoting around its own pivot axis S. In the radially outer area, the pivot arm or each pivot arm 38 then carries a pair of friction lining elements 14. Each of these friction lining elements 14 has a friction lining 40, which is supported on a disk-like carrier element 42. The two carrier elements 42 of the two friction lining elements 14 are carried in turn by way of a clinch bolt 44 or the like on the two axial sides of the pivot arm 38. Each of the friction lining elements 14 has an axially facing friction surface 46. Thus the friction surfaces 46 are ready for frictional interaction with corresponding axially opposing friction surfaces.

To pretension the individual pivot arms 38 into a home pivot position relative to the hub area 12, two spring elements 48, 50 are provided for each pivot arm 38. These are 15, hooked at one end onto pin-like connecting elements 52, 54 on the pivot arm 38 and at the other end onto similar pin-like connecting elements 56, 58 on the cover disk elements 14, 16. They thus act in opposition to each other. Each pivot arm 38 is thus pretensioned into the pivot position relative to the hub area 12 shown in FIG. 1.

When, during slip operation, local changes occur in the frictional relationships in a friction clutch equipped with this type of clutch disk 10, such as a local increase in the coefficient of friction $\mu$, the increased frictional interaction and the existing conditions pertaining to the inertial ratio cause the pivot arm 38 carrying the corresponding friction lining elements 14 to pivot around the pivot axis S against the force of one of the springs 48, 50. As a result, the radially outer area of the pivot arm 38, on which the friction lining elements 14 are carried, is shifted radially inward, with the result that the average friction radius provided by the friction surfaces 46 decreases. The product of the coefficient of friction times the average friction radius can therefore be kept nearly constant, with the result that the torque being transmitted by way of a friction clutch of this type remains nearly constant also. At the same time, a shift is also induced in the circumferential direction; that is, the overall movement also includes a circumferential component. As a result, the excitation of frictional vibrations can be prevented almost completely. Because it is possible for the individual friction lining elements or pairs of friction lining elements to change their radial and circumferential position independently of other friction lining elements supported on other pivot arms, local changes in the frictional relationships are compensated, and it is ensured that the clutch moment transmitted by the clutch remains essentially unaffected by such local changes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A clutch disk comprising:
   a hub area having a rotational axis, and
   a plurality of friction lining elements supported on the hub area and arranged in circumferential sequence about the rotational axis, each said friction lining element having an axially facing friction surface area which can make frictional contact with an axially opposing friction surface, at least one of said friction lining elements being supported on the hub area so that it is movable in a radial direction relative to said axis in response to a change in sliding friction force between its frictional surface area and the opposing friction surface.

2. A clutch disk as in claim 1 wherein said at least one of said friction lining elements is supported on the hub area so that it is movable in a circumferential direction relative to said axis.

3. A clutch disk as in claim 2 further comprising a pivot axis which is parallel to and spaced from said rotational axis, said at least one of said friction lining elements being pivotable relative to said hub area about said pivot axis.

4. A clutch disk as in claim 3 further comprising restoring means for pretensioning said at least one of said friction lining elements into a home pivot position relative to the hub area.

5. A clutch disk as in claim 1 wherein said at least one of said friction lining elements is movable in a radial direction relative to said hub area essentially independently of other said friction lining elements.

6. A friction clutch comprising a clutch disk, said clutch disk comprising:
   a hub area having a rotational axis, and
   a plurality of friction lining elements supported on the hub area and arranged in circumferential sequence about the rotational axis, each said friction lining element having an axially facing friction surface area which can make frictional contact with an axially opposing friction surface, at least one of said friction lining elements being supported on the hub area so that it is movable in a radial direction relative to said axis in response to a change in sliding friction force between its frictional surface area and the opposing friction surface.

* * * * *